US005579519A

United States Patent [19]
Pelletier

[11] Patent Number: 5,579,519
[45] Date of Patent: Nov. 26, 1996

[54] EXTENSIBLE ELECTRONIC DOCUMENT PROCESSING SYSTEM FOR CREATING NEW CLASSES OF ACTIVE DOCUMENTS

[75] Inventor: Stephen Pelletier, San Francisco, Calif.

[73] Assignee: Interleaf, Inc.

[21] Appl. No.: 923,937

[22] PCT Filed: Mar. 4, 1991

[86] PCT No.: PCT/US91/01479

§ 371 Date: Feb. 16, 1994

§ 102(e) Date: Feb. 16, 1994

Related U.S. Application Data

[63] Continuation-in-part of Ser. No. 489,176, Mar. 5, 1990, abandoned.

[51] Int. Cl.$^6$ ..................................................... G06F 9/44
[52] U.S. Cl. .............. 395/705; 395/776; 364/DIG. 1.61; 364/225.6; 364/250; 364/280.4
[58] Field of Search ................................... 395/700, 650, 395/600

[56] References Cited

U.S. PATENT DOCUMENTS 4,633,430  12/1986  Cooper ..................................... 395/144
4,996,662  2/1991  Cooper et al. ........................... 395/600
5,307,499  4/1994  Yin .......................................... 395/700
5,333,237  7/1994  Stefanopoulos ........................... 395/12

OTHER PUBLICATIONS

Sobell, Mark G., "A Practical Guide to the Unix System", Benjamin/Cummings, 1989, pp. 66–67.

Hares, John S. and Smart, John D., "Object Orientation", John Wiley & Sons, 1993, pp. 42–44.

Primary Examiner—Kevin A. Kriess
Attorney, Agent, or Firm—Hale and Dorr

[57] ABSTRACT

An improved document processing system for creating computer procedures (i.e., methods) and associating them with an electronic document structured as a nested hierarchy of constituent objects. The system includes a document processing means for creating the electronic document, and a program creating means for defining the method and associating it with the electronic document or its lower level constituent objects. The system further includes an interpreter for interpreting the computer procedure in response to a specified event.

20 Claims, 6 Drawing Sheets

EXTENSIBLE ELECTRONIC DOCUMENT PROCESSING SYSTEM FOR CREATING NEW CLASSES OF ACTIVE DOCUMENTS

This application is a national stage application of PCT/US91/01479, which is a continuation-in-part of Ser. No. 07/489,176 filed Mar. 5, 1990, now abandoned.

This invention relates to a Document Processing System for creating, editing, printing and presenting active electronic documents which are associated with computer programs.

BACKGROUND OF THE INVENTION

Electronic Document Processing Systems generally include a computer workstation programmed to allow a user to create and edit an electronic representation of a document. The workstation includes a display device for displaying an image of the document as it would appear if printed. For example, a document such as a magazine article may contain an arrangement of text and graphics. The system allows the user to edit the document by modifying existing text and graphics or by adding entirely new text or images. As the user modifies the document, the display is continually updated to reflect these changes, thereby allowing the user to interact with the system to achieve the desired document.

SUMMARY OF THE INVENTION

We have discovered an improved document processing system for creating computer procedures (i.e,. methods) and associating them with an electronic document structured as a nested hierarchy of constituent objects. The system includes a document processing means for defining the method and associating it with the electronic document or its lower level constituent objects. The system further includes an interpreter for interpreting the computer procedure in response to a specified event.

In preferred embodiments, the methods are defined in a dialect of the programming language LISP. A LISP interpreter interprets the new LISP programs, thereby allowing the user to add new methods without modifying the underlying document processing system.

DESCRIPTION OF THE PREFERRED EMBODIMENT

Figure 1A:
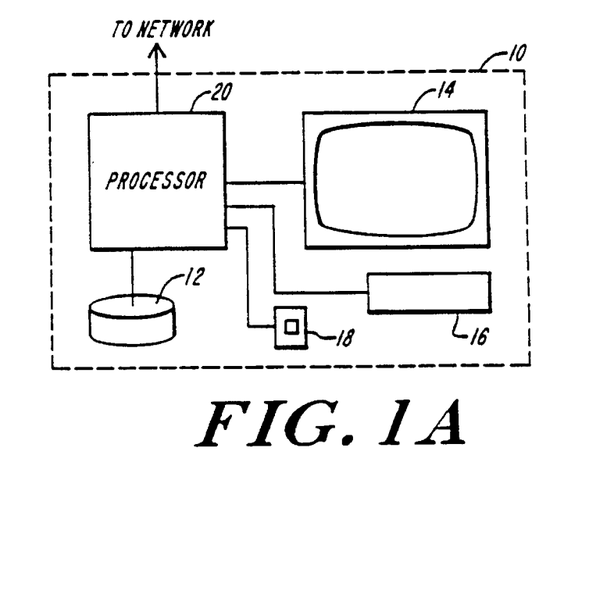
FIG. 1(a) is a block diagram of a computer workstation programmed to operate as a document processing system.
Figure 1B:
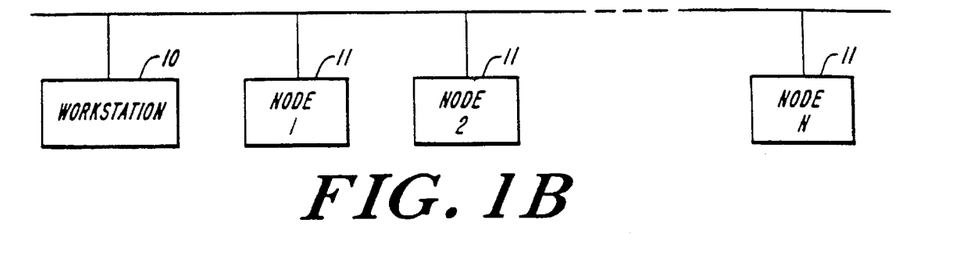
FIG. 1(b) is a block diagram illustrating a computer network which includes the computer workstation shown in FIG. 1(a).

Referring to FIG. 1 (a) an electronic document processing system 10 (herein "EDPS" 10) is implemented using a properly programmed computer workstation. The workstation includes a disk 12 for storing electronic representations of documents, and a display 14 for displaying documents for viewing by a user. The workstation is connected to an Ethernet network, thereby allowing the workstation to access documents and software stored on other nodes 11. (FIG. 1(b))

The user selects a document by manipulating a keyboard 16 and/or a mouse 18. A processor 20, in response to the user's input, retrieves an electronic representation of the selected document from disk 12 and supplies display 14 with image data representative of the selected document. In response, display 14 generates an image of the document for viewing by the user.

The user interacts with the system to modify the selected document. For example, the user may enter keyboard commands requesting the system to select certain text and delete it from the document. Processor 20 responds to the commands by editing the electronic representation of the document and modifying the image data to adjust the displayed image.

In addition to modifying the appearance of a document, a user may define a procedure to be associated with the document. The associated procedure is performed upon the occurrence of a specific event. For example, a procedure may be defined which electronically mails the document to another user as a reminder that a deadline is approaching. When the system clock indicates that a certain date has arrived, the procedure automatically mails the document. Documents having such associated procedures are referred to herein as "active" documents.

Figure 2:
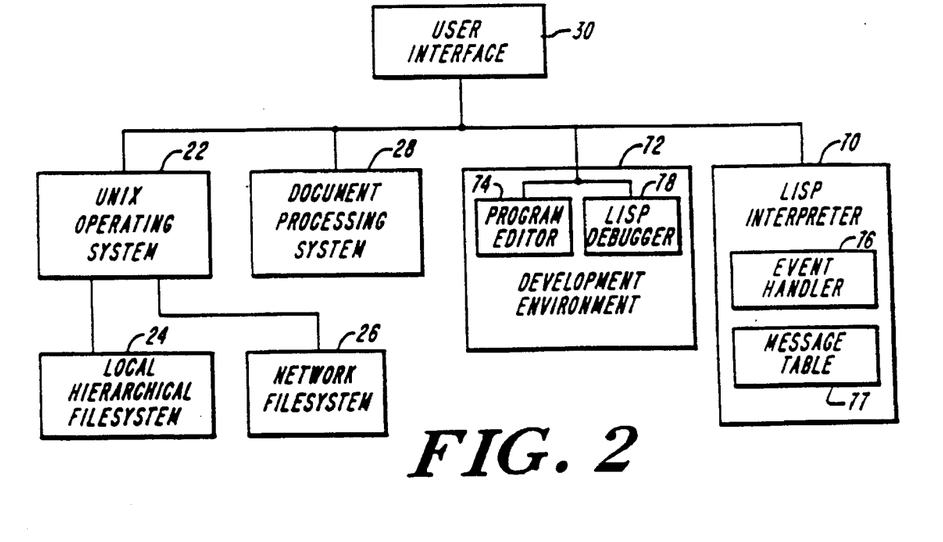
FIG. 2 is a block diagram of the software architecture of an electronic document processing system embodying the present invention.

Referring to FIG. 2, the software for implementing the document processing system is now described in more detail. EDPS 10 includes a Unix Operation System 22. The Operating System maintains on disk 12 a local hierarchical filesystem 24 which contains documents and their associated methods. It also provides access to a network filesystem 26 which includes files from remote nodes 11 which contain documents or software used by EDPS 10.

The system also includes a "WYSIWYG" document processing software 28 (herein "DPS" 28) (Note: "WYSIWYG" is a common acronym for "what you see is what you get". Such systems allow the user to view the document as it would appear if printed and interact with the system to modify the document image.) DPS 28 is an object oriented document processing system which utilizes the Unix Operating System 22 and User Interface 30 to create and modify documents.

Documents may be any type of written instrument (e.g., a memorandum or a technical manual). DPS 28 structures documents as a nested hierarchy of data objects. For example, referring to FIGS. 3 and 5, a sample memorandum 32 includes an author object 34 identifying the author of the memorandum, a destination object 36 identifying the person to whom the memorandum is addressed, and a topic object 38 summarizing the subject of the memorandum. Memorandum 32 further includes two paragraph objects 40 and 42 which contain the text of the memorandum, a pair of column objects 44, 46 each containing a list, and a graphic object 48 containing a line drawing. Each object 34–48 may consist of a plurality of lower level objects. For example, each word or character of paragraph 40 may be treated as a separate object and each symbol representing a logic gate 50–54 of drawing 48 may be treated as a distinct object. Further, the hierarchy may extend upward from the memorandum. For example, the memorandum may be a low level object attached to an appendix which in turn is connected to higher level super document (e.g., a technical manual).

Figure 4:
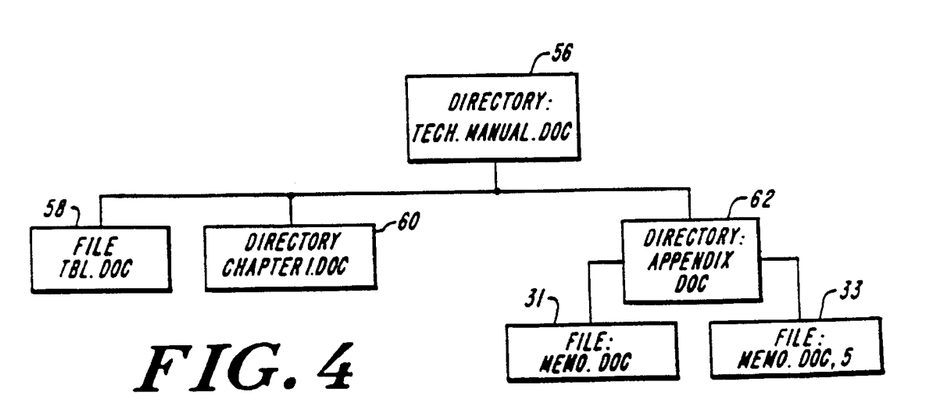
FIG. 4 is a diagram of a directory, within the Unix filesystem which contains a high level document.

The electronic representation of the document is stored by DPS 28 in one or more files within the local hierarchical filesystem 24. Referring to FIG. 4, for example, DPS 28 may utilize Operating System 22 to create a directory 56 which includes subdirectories and files containing all objects of a technical manual. Directory 56 may include a file 58 containing an electronic representation of a table of contents. Further, it may include a subdirectory 60 which may include an entire tree (not shown) of files and subdirectories containing objects which comprise the first chapter of the manual.

Thus, DPS 28 uses the file structure of the Unix Operating System to provide a hierarchical structure of data objects. Yet even within a single file of the Unix filesystem, DPS 28 may add additional layers of objects. For example, in the file structure shown in FIG. 4, the electronic representations of all data objects 34–48 of the memorandum document 32 are stored in a single file 31 within an Appendix directory 62. The data objects 34–48 within memorandum file 31 include at least two layers of objects, e.g., the symbols representing logic gates 50–54 are children of the parent graphic object 48.

Figure 3:
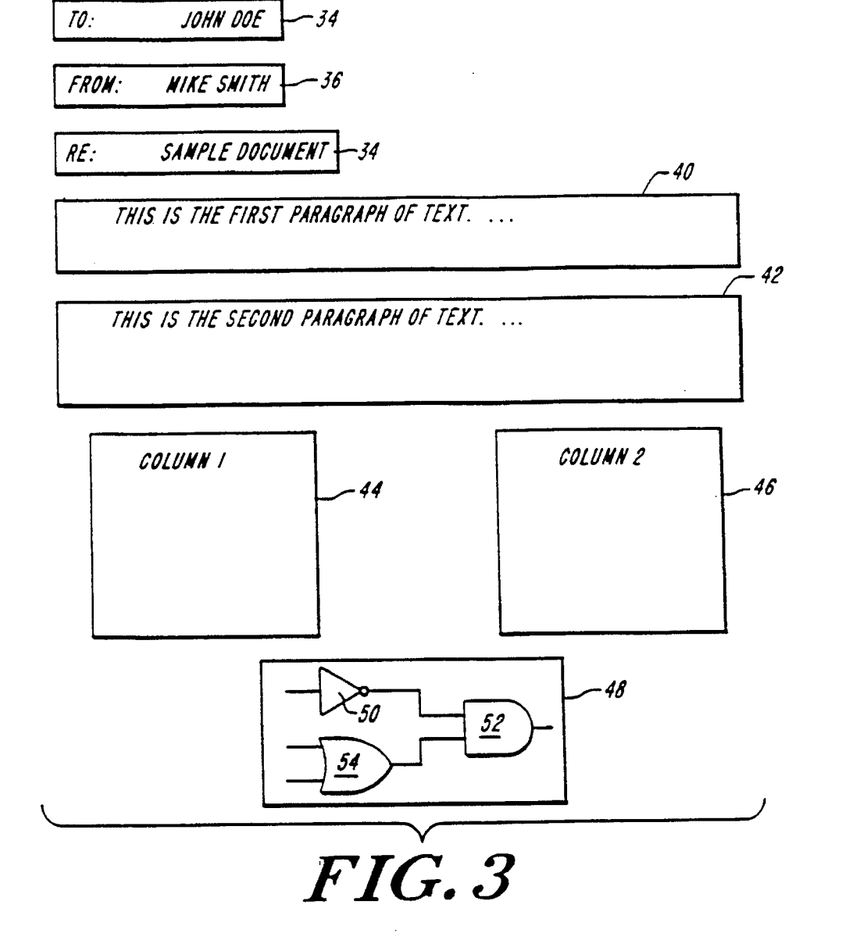
FIG. 3 is an illustration of an electronic document as it would appear if displayed or printed.

As explained above, any data object within the hierarchy may be associated with a method which, upon the occurrence of a certain event, will be implemented. For example, referring to FIG. 5, memorandum 32 is associated with an open method 64. When a user, via user interface 30, indicates that he desires to view memorandum 32, the open method 64 is implemented to open the memorandum file 31 and prepare image data representative of how the document would appear if printed. The image data is supplied to display device 24 which generates an image of the document as shown in FIG. 3. Similarly, when the user indicates the desire to close memorandum 32, close method 66 is implemented to store the electronic representation of the memorandum and remove its image from the display.

Figure 5:
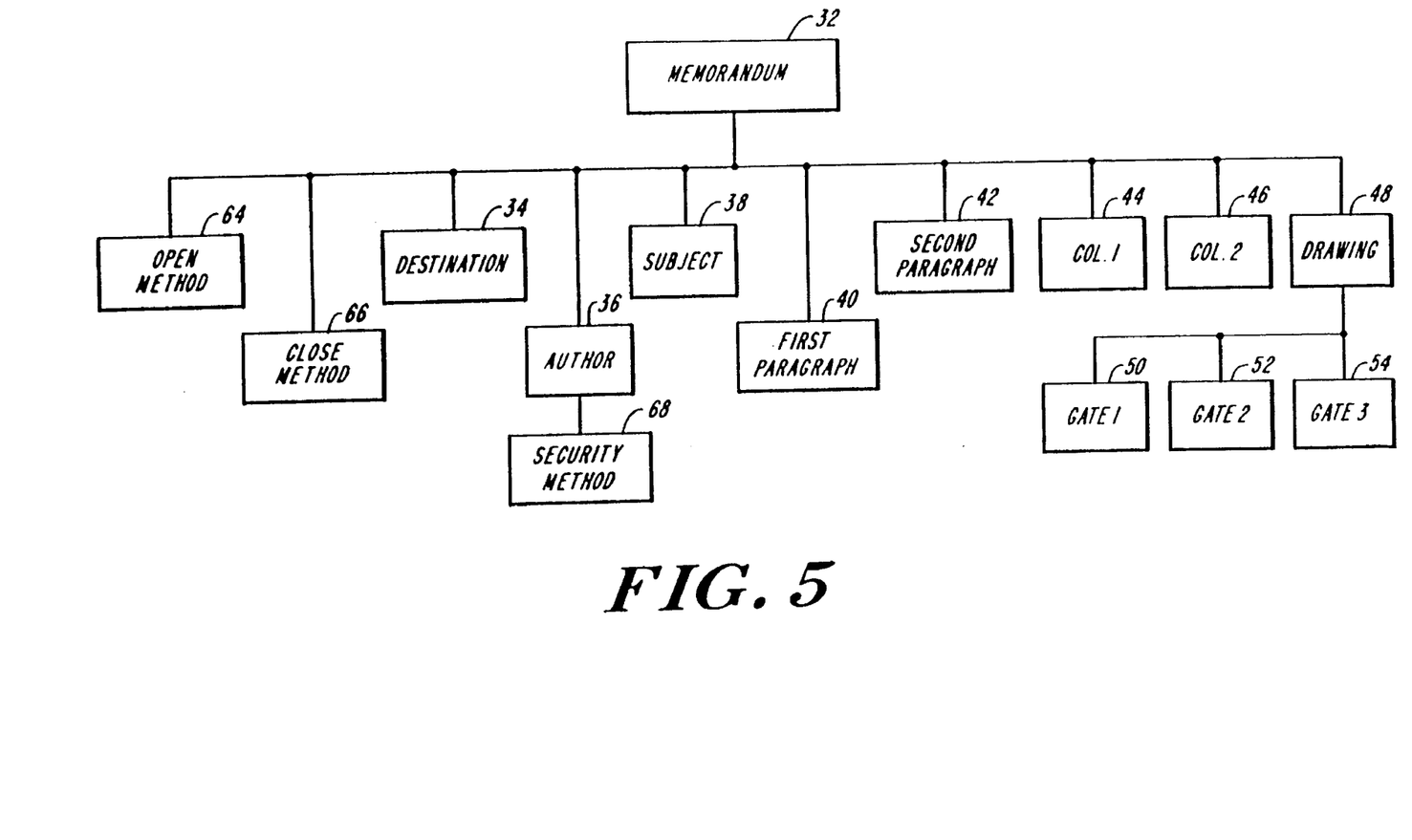
FIG. 5 is a schematic of the hierarchy of data objects and methods comprising the memorandum document shown in FIG. 3.

Methods may be attached to an object anywhere within the nested hierarchy, e.g., to a technical manual which is near the top of the hierarchy, to a memorandum, or even to a relatively low level object such as author object 36 (see e.g., security procedure 68).

A method is a collection of instructions specified in a dialect of the language LISP. The collection of LISP instructions which define the method are stored in a file within the local hierarchical filesystem 24. For example, referring to FIG. 4, open method 64 is defined by a set of LISP instructions stored in file 33. To indicate that the open method is associated with memorandum 32, DPS 28 stores the method file 33 in the same directory as the memorandum file 31 and assigns the method file 33 a Unix filename comprising the filename of memorandum file 31 with the suffix ",5". For example, if memorandum file 31 is named "memo.doc", file 33 is assigned the name "memo.doc,5".

Several active objects may have the same hierarchical structure of data objects and attached methods. They differ only in the content of their data objects. Such objects are considered to be instances of the same object class. For example, paragraph objects of the same class have the same procedures for setting margin and font. However, the text of each paragraph object is unique to the paragraph object.

To facilitate the creation of active documents, the system includes a collection of predefined classes of active objects ranging in complexity from the lowest level object to high level objects at the top of the nested hierarchy. More specifically, for each predefined class, the system in effect includes a generic object which is an instance of the class. The generic object includes a hierarchy of empty data objects with attached predefined methods. A user may build a desired active document by copying selected generic objects (with their associated methods) and filling the empty data objects with the desired data.

Figure 6:
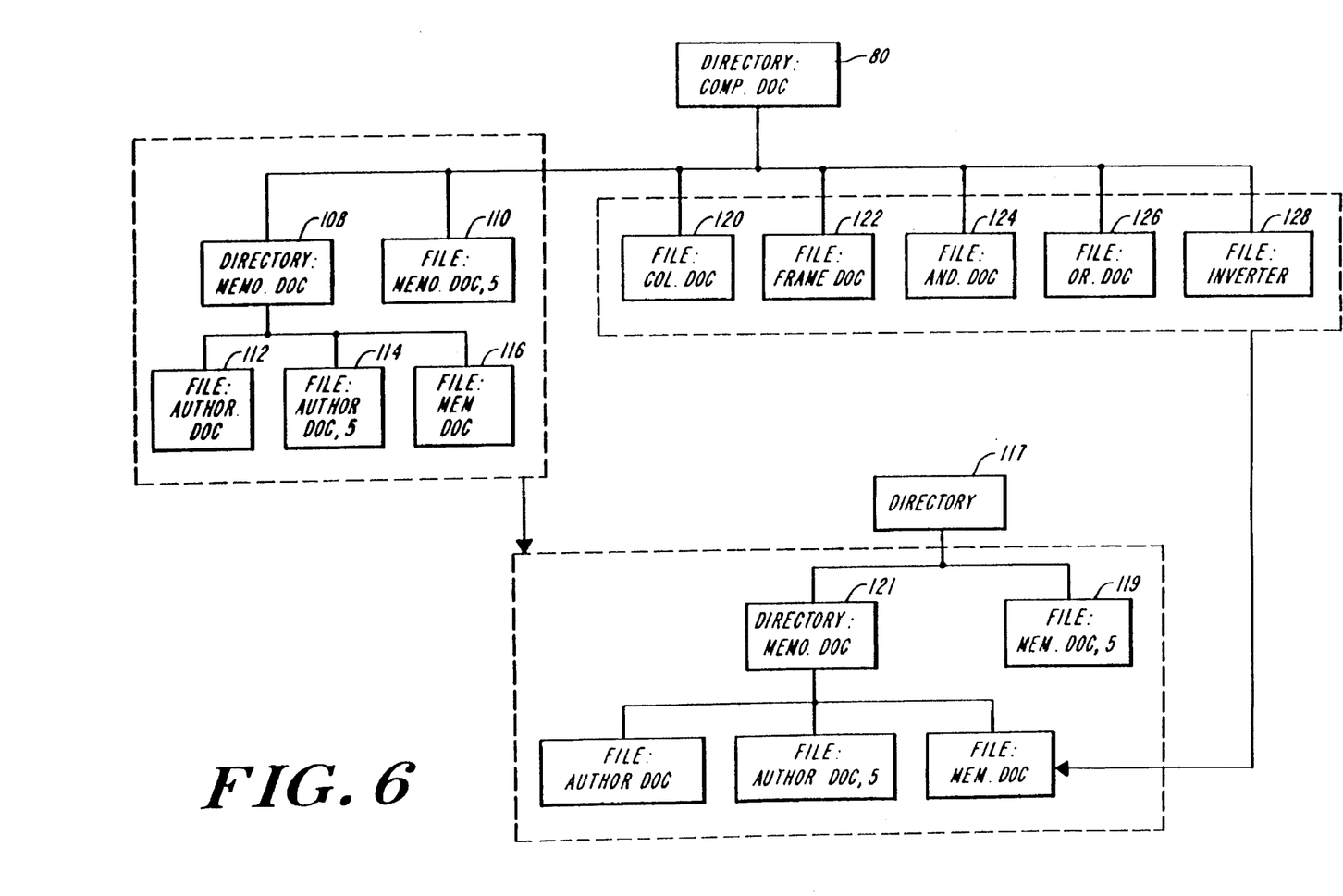
FIG. 6 is a diagram of a directory within the Unix filesystem which contains generic document objects.
Figure 7:
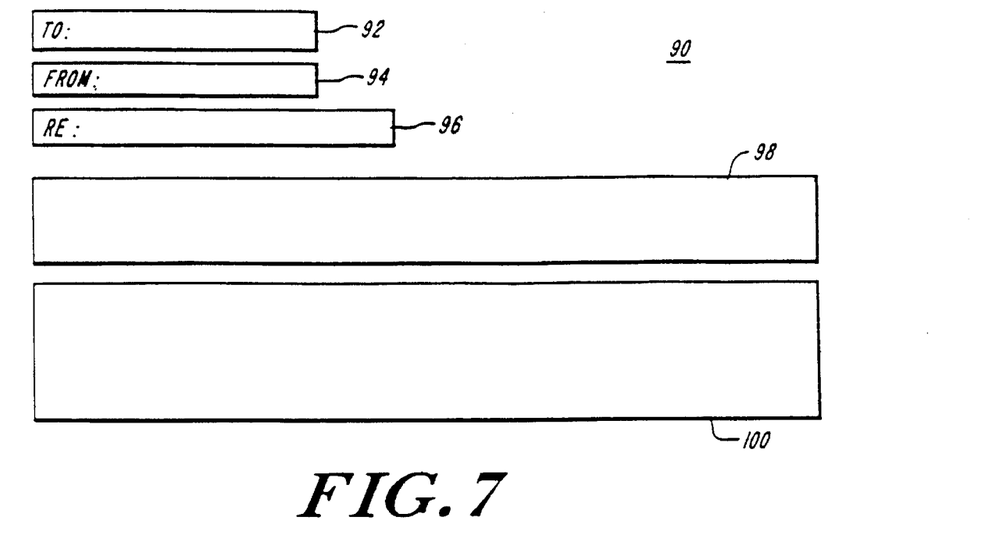
FIG. 7 is an illustration of a generic memorandum document as it would appear if printed.
Figure 8:
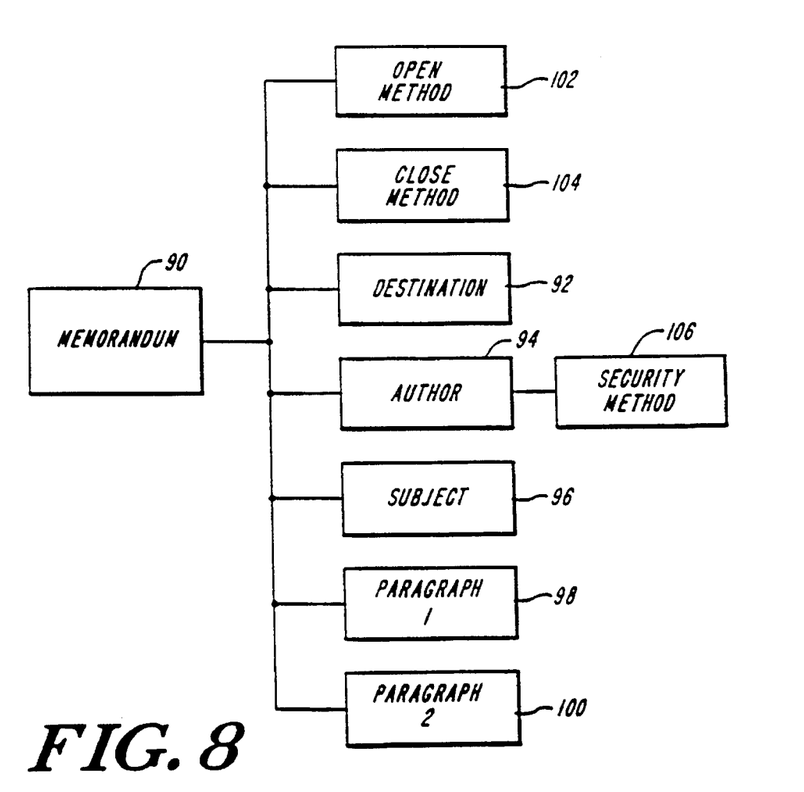
FIG. 8 is a schematic of the hierarchy of generic data objects and methods comprising the generic memorandum object shown in FIG. 7.

The following illustrates this technique by describing the construction of a memorandum from several generic objects. Referring to FIG. 6, local filesystem 24 includes a directory 80 which contains predefined generic document component objects which may be used as building blocks in constructing a desired document. For example, directory 80 may include a boilerplate memorandum document object 90. The image of the generic memorandum object 90 is depicted in FIG. 7. It includes a destination object 92 which lacks data identifying the destination. Similarly, it includes an author object 94, a subject object 96 and a pair of paragraph objects 98, 100, each having no data. The schematic of the generic document, shown in FIG. 8, indicates that object 90 is associated with a pair of methods 102, 104 for opening and closing the document. Further, the author object is associated with a security method 106.

FIG. 6 illustrates the Unix files which contain the generic memorandum object 90 and its associated methods. Subdirectory 108 contains all of data objects within memorandum 90. The methods 102, 104 associated with object 90 are stored in file 110. To indicate that the methods are associated with the memorandum object, directory 108 is named "memo.doc" and the file 110 containing the methods is named "memo.doc,5". The author object 94 is stored in a file 112 within subdirectory 108. Similarly, its associated security method is stored in file 114 in the same directory. Finally, all remaining objects are stored in file 116 within subdirectory 108.

DPS 28 copies the generic object by copying directory 108, including all children, to a desired location, e.g., destination directory 117 (FIG. 4). Similarly, it automatically copies its associated method file 110 to the same location. The user can then open each of the data objects within the new document to add data (e.g., to add a name to the destination object).

Assume the user wants to build a memorandum document such as memorandum 32. Document object 90 lacks a pair of column objects and a graphic object similar to those of memorandum 32 (FIG. 3). Accordingly, the user copies generic objects corresponding to the missing items from directory 80. For example, file 120 contains an empty column object, file 122 contains an empty frame object for graphics, and files 124–128 contain graphic components such as components 50–54 of memorandum 32. In response to the user's selection, DPS 28 appends copies of these generic objects to file (121) (See FIG. 6), thereby constructing the desired memorandum. The system thus allows a user to construct a variety of new active documents by merging selected generic objects.

Referring to FIG. 1, the system includes an interpreter 70 for interpreting the LISP programs. The interpreter includes a method table 77 for each class of documents which identifies the location of all LISP methods associated with the class and its lower level objects.

Generally, an object's method may be invoked in two ways, (1) in response to a LISP instruction within another method, or (2) in response to an external event directed to the object.

With regard to the first example, the LISP dialect provided by LISP interpreter 70 includes a "tell" instruction which includes two arguments, a Path Name identifying a specific object, and a Message Identifier identifying a "message" to be sent to the specified object. In response to a LISP message directed to a specified object, interpreter 70 searches the method table 77 to locate the method attached to the specified object which is responsive to the message. It then responds to the message by evaluating the method. For example, a LISP "tell" instruction may send an "open" message to memorandum 32. In response, interpreter 70 locates and evaluates the memorandum's open method.

A method may also be triggered in response to an external event, e.g., an instruction from user interface 30 to open a specified document. However, user interface 30, Unix Operating System 22 and other software which may generate such external events, are typically written in the Language "C". Accordingly, the LISP interpreter includes as event handler 76 which allows non-LISP programs to access methods written in the LISP language. More specifically, event handler 76 responds to a "C" language call instruction from software such as user interface 30 and Unix Operating System 22 by locating and evaluating the appropriate LISP code. For example, in response to a "C" language call from user interface 30 to open memorandum 32, event handler locates method 64 and evaluates it.

The user may desire to create an active document having an associated method which is not available among the predefined generic classes of objects. Thus, the system further includes development environment 72 for allowing the user to create a new class of active objects by creating new methods and attaching them to an existing object.

To create a new method, the user, via user interface 30, first invokes development environment 72. Environment 72 allows the user to select, from all existing objects, an active object whose associated methods most closely match those desired in the new class. For example, suppose a user wants the above created memorandum object 90 to electronically mail itself whenever it is closed. With the exception of the "automail" method, the memorandum object 90 already has all the methods desired in the new class (e.g., open and close methods 64, 66). Accordingly, the user simply needs to draft the new method and attach it to the memorandum object.

Figure 9A:
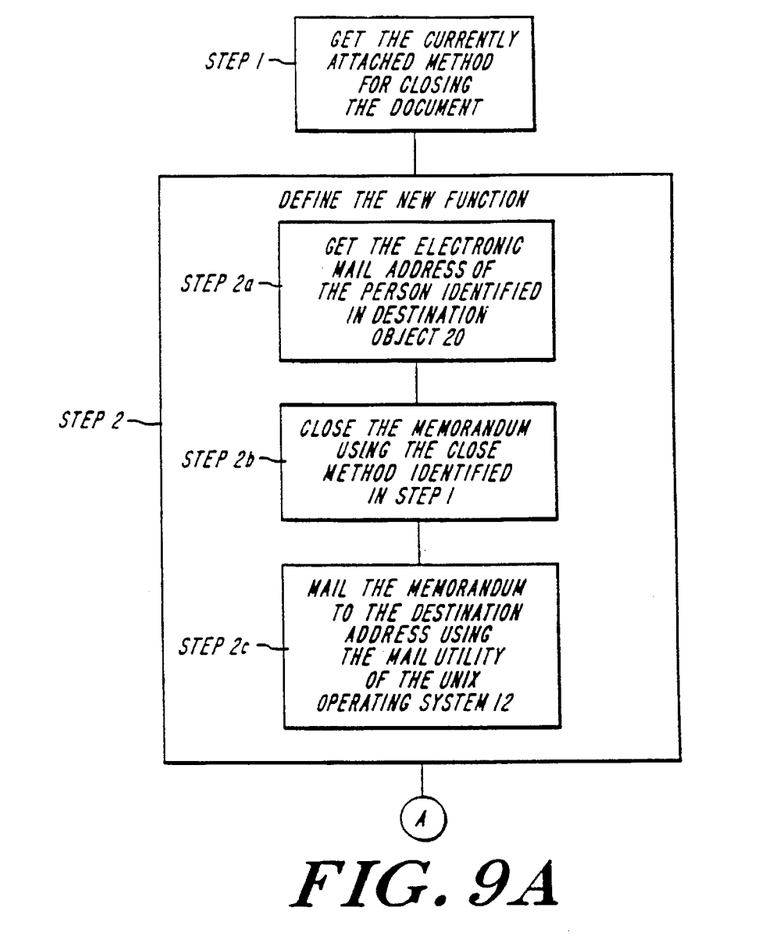
FIGS. 9(a) and (b) is a flow chart of a LISP program for defining a new method and attaching it to a document.
Figure 9B:
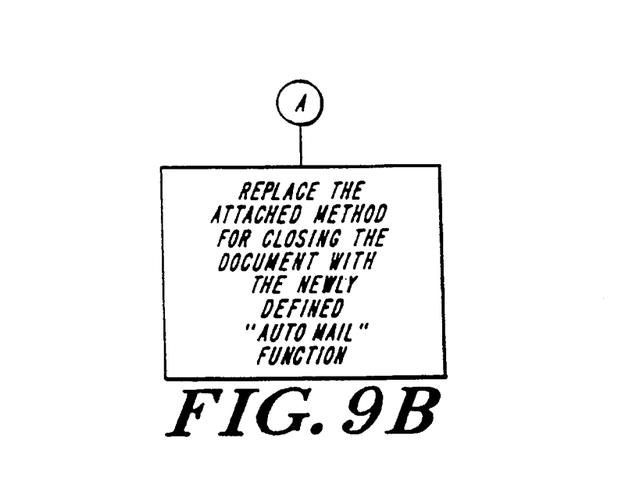

Toward this end, environment 72 includes a program editor 74 for allowing a user to define the new method in the interpretive language LISP. (See FIG. 2) For example, referring to FIGS. 9(a), 9(b) the user drafts a LISP program which first determines the identity of close method 104 which is currently attached to the copied object (step 1). The LISP program next defines a new function "automail" having the following three steps:

1. Get the electronic mail address of the person identified in destination object 92 (step 2a);
2. Close the memorandum using the close method 104 identified in step 1 above (step 2b), and
3. Mail the memorandum to the destination address using the mail utility of Unix Operating System 22 (step 2c).

After defining the new function, the next LISP instruction updates the method table 77 to replace the close method 104 currently attached to the memorandum with the new "automail" function defined above (step 3). Accordingly, evaluation of step 3 of the above LISP program attaches the "automail" function to the document by replacing close method 104 with the newly defined automail function.

To indicate that a new method has been added to memorandum 90, development environment 72 stores the above LISP code in the method file 119. Method file 119 is in the same directory 117 as subdirectory 121 which contains the data objects of memorandum 90. Subdirectory 121 is named "memo.doc." and the method file 119 is named "memo.doc, 5". When DPS 28 next attempts to access the newly created memorandum, interpreter 70 will look to the method file associated with the memorandum, (i.e. "memo.doc.,5") and interpret the new LISP code, thereby updating the message table to include the newly defined method. Development Environment 72 further includes a LISP Debugger 78 which allows the user to test newly drafted LISP Code and locate errors in the code.

Interpreter 70 allows the user to create new methods without the need to recompile the system software. In response to a LISP instruction, LISP interpreter 76 calls existing subprocedures in DPS 28, Unix Operating System 22 and/or any external application procedures which may be accessible over the network. The execution of these subprocedures implement the LISP instruction. Accordingly, the methods which can be described in LISP are limited to combinations of procedures existing in EDPS 10 or otherwise accessible to LISP interpreter 70 at the time the LISP interpreter is compiled.

In defining a new method, the user must also select the event which will trigger the execution of the new method. The following are examples of events which can be used to trigger methods (Note: certain events are available as triggers to only certain classes of objects):

1. the opening or closing of a document object,
2. the saving of a document, or automatically saving a backup version,
3. the user entering a particular content in the document associated with the procedure,
4. the user entering a particular content in the different document,
5. the starting of an external application,
6. an application outputting a particular result,
7. the mouse being moved to a certain position,
8. any test or graphic object being selected,
9. any popup menu choice of user interface 14 affecting any text or graphic object,
10. the system clock reaching a certain time or date,
11. any mouse button being pressed,
12. any key stroke or set of keystrokes, and
13. an attempt to edit any text of graphic object.

Accordingly, EDPS 10 is an extremely extensible system, allowing the user to create a variety of active documents. The following illustrates several examples of active documents which may be prepared with EDPS 10.

1. An expense form that automatically inserts its total into a separate annual tally; the entries in the annual tally are automatically hyperlinked back to their original expense reports.
2. An interactive training manual that customizes its next chapter based upon your score on a test at the end of the previous chapter.

3. A repair manual that shows an on-screen video of the procedure in question when you press a "button".
4. A report on how a programming project is proceeding which automatically imports data from the computer-aided software engineering (CASE) application. The report has hyperlinks to the CASE software automatically installed.
5. A press release that knows to print "Draft" across its pages until the system clock reaches the announcement date listed at the beginning of the text.
6. A confidential letter of intent that won't print at all until it has been approved by all the appropriate people.
7. A proposal that shows and hides different portions depending on the security clearance of the person viewing it.
8. An urgent memo that integrates with voice annotation software so when it mails itself to someone, it announces its presence audibly.
9. A document created from a database which updates the database if you make any changes in the imported document.
10. A corporate policies bulletin that automatically formats itself to the preferences of the user who opens it.
11. An animated on-screen "slide show" presentation that tailors itself to the audience's needs based upon their response to questions.
12. A document that will let you enter text but not cut paragraphs unless you have the appropriate access.
13. A time-critical document that knows when it's due and appears on screen to remind you of when you need to work on it.
14. A calendar that knows the date, knows which documents are due, and automatically opens the ones you need to work on.
15. A document that lets you type in directions (e.g., "Go north 1.5 miles") and automatically generates a graphic map.
16. A capital request form that automatically opens up the appropriate forms as you tell it what type of equipment you need.
17. A real-estate listing, complete with text and photos, that automatically shows only the listings that meet users' needs.
18. A customer receipt that automatically runs a "frame grabber" and incorporates a photographic image of the purchaser.
19. A WYSIWYG document that can send itself over an electronic mail system.
20. A stock-market information center that retrieves stock information and displays it in text and charts that can be automatically distributed or incorporated in other documents.
21. An interactive novel, including text graphics, that completes itself based on users choices. If the user goes back to a previous selection and decides to pick up the phaser instead of the magic bow, the document re-creates itself to reflect that choice.
22. Training manuals that can be made funny, serious, sarcastic or philosophical based on reader discretion.
23. A manual that queries the reader about how much time she or he has and condenses itself accordingly.
24. Memos that send themselves to you reminding you of important dates and events.
25. A document linked to a corporate database that automatically creates a hyperlinks to an organization chart.
26. A document that creates graphic overheads formatted strictly to corporate standards. For example, if a user tries to add a sixth bulleted item, he will be told that only five are allowed on a page.
27. A speech that automatically includes reduced versions of the associated slides.
28. A weekly report that builds a time-line based upon information in a corporate database. If anyone is more than a week behind, it queries the database for more information and builds a document on a manager's desktop.
29. An international set of guidelines that knows to convert to the appropriate units of measurement—where it says "1 inch" in the U.S. version it would say "2.54 cm" in the European version.
30. A document that knows to re-send itself to the company lawyer if anyone makes any changes to it after the lawyer has approved it.
31. A scholastic test that includes an entire database of questions. The teach selects which areas to cover and how hard the questions in random order (It also tracks which questions have been used on previous tests.) It also automatically creates the answer key.
32. A phone directory that can call the person who's name you've selected; if the line is busy, it puts you into electronic mail.
33. A section of a manual that is linked to the database of standards for that industry; it won't let you make errors in formatting.
34. An on-screen brochure questions the user about her or his software/hardware configuration needs. As the user answers the questions, a suggested configuration is illustrated and listed in tabular fashion.
35. An interactive form that walks down a decision tree and shows you a graphic representation of the tree as you do so.
36. An interactive form to help you find the automobile of your dreams. It asks you for your preferences, queries a database, presents a list of the cars that meet your requirements, and then re-queries the database to build a personalized text and graphics spec sheet for the car you're interested in.
37. A contract that lists on screen everyone who has viewed it or modified it.
38. An illustrated parts catalog that builds an order form based on which items you click your mouse on—and then electronically submits your order.
39. A classified ad newsletter that builds itself automatically out of data in a database.
40. A price list that automatically converts the monetary units to the proper ones for the country in which it is being used.
41. A catalog that contains a table of options for a car with prices and specifications. As you select options, an illustration of the car updates on screen to reflect the new configuration.
42. An electronic datebook which checks the datebooks of everyone else in a workgroup and finds a time when all can meet. Any documents "pasted into" the datebook at that meeting time are automatically distributed to everyone invited to the meeting.

43. Whenever any sales region falls behind in its projections, a document is automatically built and sent to the VP of Sales. The document draws upon data in databases across the country. It automatically generates a map of the country, color-coded for how well each is performing.

44. A proposal that contains a table created from data in a spreadsheet. If any of the numbers in a particular set of columns is negative, the document queries another application, gets the explanation, and creates a footnote.

45. A document that can be open on two desktops; as each person works on it, the other person's copy is updated.

46. An automobile operating manual that has illustrations that show the steering wheel on the left or the right depending on whether the document is being viewed in the United Kingdom or in France.

47. A research report form that knows, when it's saved, to break itself into pieces and update various laboratory-wide databases.

48. A restaurant menu with actual restaurant costs there but not printed. The restaurant manager selects the items she or he wants to combine into the daily specials and reports on the restaurant's actual costs, to help the manager price the specials.

Additions, subtractions, deletions, and other modifications of the preferred particular embodiments of the invention will be apparent to those practiced in the art and are within the scope of the following claims.

What is claimed is:

1. An electronic document processing system comprising:

a document processor for creating an electronic representation of a document having one or more portions, the documents being arranged in a hierarchical structure, each portion being on one of multiple levels of the hierarchical structure;

a computer procedure creator, responsive to user inputs, for creating a computer procedure and for associating the created computer procedure with one or more user selected portions on one or more of the levels; and a program definer for defining the created computer procedure to be operative with respect to the electronic representation of one or more portions of the document in response to at least one predetermined event.

2. The system of claim 1, further comprising an interpreter for interpreting the created computer procedure in response to the predetermined event.

3. The system of claim 2, wherein the interpreter includes for each class a table that identifies a location of procedures associated with the class and the objects in the class.

4. The system of claim 1, wherein the portions of the document are objects, at least some of which are stored in a single document file, and wherein the computer procedure creator causes the created computer procedures to be stored in a procedure file separate from the document file.

5. The electronic document processing system of claim 2 wherein the interpreter is a LISP interpreter.

6. The electronic document processing system of claim 5 wherein said program definer comprises a program editor for creating LISP procedures, and a LISP debugger for testing the LISP procedures.

7. The electronic document processing system of claim 2 further comprising an operating system, and in which said interpreter causes the defined computer procedures to be implemented on the associated one or more portions of the document by executing subprocedures of said operating system.

8. The electronic document processing system of claim 7 wherein said operating system is a UNIX operating system.

9. The electronic document processing system of claim 2 further comprising a network interface means for interfacing with a network and for enabling said interpreter to execute the procedures by executing subprocedures stored on at least one remote device connected to the network.

10. The electronic document processing system of claim 1 wherein said at least one event includes the opening of a document object.

11. The electronic document processing system of claim 1 wherein said at least one event includes the entry of a specified object in a document object.

12. The electronic document processing system of claim 1 wherein said at least one event includes the execution of a specified application.

13. The electronic document processing system of claim 1 wherein said at least one event includes the output by a specified application of a specified result.

14. The electronic document processing system of claim 1 wherein said at least one event includes the movement of a cursor to a specified position.

15. The electronic document processing system of claim 1 wherein said at least one event includes the selection of a specified object.

16. The electronic document processing system of claim 1 wherein said at least one event includes the selection of a specified menu option.

17. The electronic document processing system of claim 1 wherein said at least one event includes the occurrence of a specified moment in time.

18. The electronic document processing system of claim 1 wherein said at least one event includes the pressing of a specified key.

19. The electronic document processing system of claim 1 wherein said at least one event includes an attempt to edit a document object.

20. The electronic document processing system of claim 18 wherein said specified key is a mouse button.

* * * * *